United States Patent Office 3,499,742
Patented Mar. 10, 1970

3,499,742
SMOKE SUPPRESSANT FUEL COMPOSITION
Doris Kivelevich and James G. Dadura, Fishkill, and George W. Eckert, Wappingers Falls, N.Y., assignors to Texaco Inc., New York, N.Y., a corporation of Delaware
No Drawing. Filed June 22, 1967, Ser. No. 647,949
Int. Cl. C10l 1/18, 1/24
U.S. Cl. 44—76                     11 Claims

ABSTRACT OF THE DISCLOSURE

There is disclosed a smoke inhibited diesel fuel composition comprising a hydrocarbon distillate fuel containing smoke suppressing amounts of a calcium alkylphenolate or sulfurized calcium alkylphenolate overbased with calcium 2-methoxyethoxide alone or with calcium hydroxide-2-methoxy-ethoxide. There is also disclosed a method of operating a diesel engine using the smoke suppressing additive combination.

---

This invention relates primarily to a diesel fuel composition which has been treated to suppress the formation of smoke during the combustion of the fuel. The invention also relates to a method of operating a diesel engine in such a manner that there is a minimum of harmful, obnoxious exhaust smoke from the engine.

Diesel engines, which burn a distillate hydrocarbon fuel oil, tend to discharge substantial quantities of smoke in their exhaust. Diesel exhaust smoke is objectionable not only from the aesthetic viewpoint but also because it adds a very substantial pollution load to the atmosphere. Indeed, the operation of diesel engine-powered vehicles has come under strict regulations in some places with regard to when and where they may be operated and how much smoke can be discharged in their exhaust.

In view of the regulation of diesel smoke exhaust, smoke suppressants are commonly employed in or added to diesel fuel oils particularly when the diesel engines are to be operated in areas of high population density. In general, the most common smoke suppressants employed are the organic compounds of barium, particularly the barium carbonate overbased barium sulfonates, which are effective for substantially reducing the amount of smoke exhaust from a diesel engine. There are serious questions concerning the use of barium compounds as smoke suppressants, however. It is well known that some barium compounds are toxic to ingestion by human beings at high dosages. Calcium compounds, particularly calcium carbonate overbased calcium sulfonate, have been proposed to replace the barium carbonate overbased barium compounds in diesel fuels. However, the calcium carbonate overbased calcium sulfonates have not enjoyed any appreciable degree of use because of a number of serious disadvantages connected with their use.

The ineffectiveness of the calcium carbonate overbased calcium sulfonate is shown by the comparative results in Table I below:

TABLE I
[Smoke reduction by CaCO₃ and BaCO₃ overbased sulfonates]

| Additives | Percent metal in fuel | Smoke, reduction, percent Petter Engine | GM 3-71 Engine |
|---|---|---|---|
| BaCO₃ Overbased Ba Sulfonate. | 0.17% Ba | 51 | |
| Do | 0.10% Ba | 50 | |
| CaCO₃ Overbased Ca Sulfonate (11/1). | 0.17% Ca | 9 | |
| CaCO₃ Overbased Ca Sulfonate. | 0.072% Ca | | 6 |

A novel diesel fuel composition and a method of operating a diesel engine have now been discovered whereby diesel fuel compositions containing an overbased (but non-CaCO₃) alkylphenolate or sulfurized alkylphenolate additive is effective to provide a substantial suppression of the diesel exhaust smoke and at the same time overcome serious operating disadvantages experienced with the earlier use of calcium. By the term "overbased" it is meant that the ratio of the number of equivalents of calcium moiety to the number of equivalents of phenol moiety is greater than 1, i.e, the calcium metal ratio is greater than 1. In contrast, the equivalent ratio of calcium to phenol moiety in normal calcium alkylphenolate is 1:1, i.e. a calcium metal ratio of 1.

In accordance with this invention, a hydrocarbon base diesel fuel oil composition is provided containing minor amounts of a calcium alkylphenolate or sulfurized alkylphenolate and an overbasing component of a calcium alkoxyalkoxide represented by the formula:

$$Ca[O(R'O)yR]_2$$

in which R represents nil, hydrogen or an alkyl radical having from 1 to 10 carbon atoms, R' is an alkylene radical having from 2 to 4 carbon atoms, z has a value of 1 when R is nil and z has a value of 2 when R is H or alkyl and y has a value from 0 to 4. Alternately, the overbasing component may be a mixture of the calcium alkoxyalkoxide plus calcium hydroxide. It is an important feature of this fuel composition that it give a substantial reduction of smoke emissions without adding harmful or poisonous materials to the exhaust smoke and without reducing the combustion efficiency of a diesel engine. The method of the invention comprises operating a diesel engine by burning a hydrocarbon diesel fuel therein containing smoke suppressing amounts of the above-noted additive combination.

The composition of the additive combination of the invention is critical. The calcium alkylphenolate component must be employed in combination with a calcium alcoholate to be effective. The expression calcium alkylphenolate components as employed herein refers to both calcium alkylphenolate and calcium sulfurized alkylphenolate as more fully defined below. Other calcium compounds while equivalent in some applications do not provide a satisfactory level of smoke reduction and/or cause a substantial reduction in the efficiency of the diesel engine.

The calcium alkylphenolate component is represented by the formula:

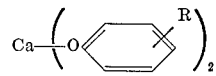

in which R is an alkyl radical having from about 4 to 100 carbon atoms. These compounds are conveniently prepared by reacting calcium oxide, calcium hydroxide or preferably calcium alcoholate with an alkylphenol until the calcium alkylphenolate has formed. The preferred phenolates are those in which the alkyl radical has from 4–30 carbon atoms. Examples of effective calcium alkylphenolates include Ca butylphenolate, Ca hexylphenolate, Ca octylphenolate, Ca nonylphenolate, Ca decylphenolate, Ca dodecylphenolate, Ca tetradecylphenolate, Ca hexadecylphenolate, Ca dibutylphenolate, Ca 4-nonyl-o-cresolate, Ca 4-dodecyl-o-cresolate, Ca eicosylphenolate and Ca eicosyl-o-cresolate. Calcium sulfurized alkylphenolates can be employed in place of the calcium alkyphenolates disclosed above in the additive combination. The calcium sulfurized alkylphenolates are prepared by reacting the noted calcium alkylphenolates with elemental sulfur. Both the calcium sulfurized alkylphenolates and their method of preparation are disclosed in copending application, S.N. 640,362 filed on May 22, 1967.

The calcium alkylphenolate component must be employed as a complex with a basic calcium alcoholate or calcium alcoholate and calcium hydroxide to provide an effective smoke suppressing additive. The combination of a calcium alkylphenolate component with a calcium alcoholate appears to be critical. For example, the calcium carbonates are essentially ineffective when combined with the calcium alkylphenolate. Calcium hydroxide alone gives an unstable additive when combined with a calcium alkylphenolate. However, calcium hydroxide can be employed as the third component of an additive combination also comprising calcium alkylphenolate or preferably sulfurized calcium alkylphenolate and calcium alcoholate. Calcium sulfurized alkylphenolates by themselves are ineffective because they cause fuel injector fouling (clogging).

The effective calcium alcoholates are represented by the formula:

$$Ca[O(R'O)_yR]_z$$

in which R represents nil, hydrogen or an alkyl radical having from 1 to 10 carbon atoms, R' is an alkylene radical having from 2 to 4 carbon atoms, z has a value of 1 when R is nil and z has a value of 2 when R is H or alkyl and y has a value from 0 to 4. Examples of effective overbasing compounds include: calcium 2-methoxyethoxide, calcium 2-methoxy propoxide, calcium 3-methoxy butoxide, calcium 2-ethoxyethoxide and calcium 2-butoxyethoxide.

The overbased calcium alkylphenolate additive combination is employed in the diesel fuel to provide a concentration of total calcium in the fuel ranging from about 0.01 to 0.4 weight percent calcium. Lesser amounts of the smoke suppressing additives impart no significant improvement in the smoke suppression properties of the fuel. The calcium alkylphenolate and the calcium alcoholate can be prepared as a mixture but need not be employed in equivalent amounts. A method for preparing calcium alcoholate and hydroxide alkylphenolate combinations is disclosed in copending application S.N. 624,193 filed on Mar. 20, 1967. The preferred proportions in the additive range from 0.1 to 3 mole of the overbasing component per mole of calcium alkylphenolate.

The smoke suppressant additive of the invention is employed in a diesel fuel which is a mixture of hydrocarbons boiling in the range from about 350° F. to about 700° F. The additive is readily soluble in the hydrocarbon fuel oil composition at the concentrations employed and can be mixed into the fuel in any convenient way.

The effectiveness of the smoke suppressant fuel and method of the invention was determined by burning untreated fuel and additive-containing fuel in diesel engines and measuring the smoke in the exhaust. The engines employed in this test were a four-cycle one cylinder Petter engine with a 16.5:1 compression ratio and an open combustion chamber and a two-cycle three cylinder GM 3-71 engine with a 17/1 compression ratio and an open combustion chamber. The intensity of the exhaust smoke was determined by passing a beam of light through the full flow of exhaust gases to a photoelectric cell on the opposite side of the exhaust pipe. This apparatus is disclosed in a commonly assigned copending application entitled "Smoke Measuring Apparatus" S.N. 625,621, filed on Mar. 24,1967. A scale of 0 to 100 on an ammeter was used to give a measure of the smoke intensity. A reading of 0 corresponded to complete light transmission and a reading of 100 to complete light extinction. The test fuels were prepared from a diesel fuel having the following properties and inspection values:

| | | |
|---|---|---|
| Gravity API | | 37.4 |
| Sulfur, percent weight | | 0.087 |
| ASTM distillation: | | |
| IBP | °F | 368 |
| 10% | °F | 433 |
| 50% | °F | 508 |
| 90% | °F | 571 |
| EP | °F | 608 |

The calcium $C_{10-12}$ alkylphenolate containing calcium alcoholate, Run 4, was prepared by reacting alkylphenol, where the alkyl was propylene tetramer, with calcium alcoholate, such as calcium 2-methoxyethoxide in such a ratio that the products contained both the neutralized calcium alkylphenolate and excess calcium alcoholate after removal of solvent. The calcium sulfurized $C_{10-12}$ alkylphenolate overbased with calcium 2-methoxyethoxide, Run 5, was prepared from a $C_{10-12}$ alkylphenol following the procedure described in Example VII, page 19 of copending application S.N. 624,193 referred to above.

The percent smoke reduction for the various additives is set forth in Table II below:

TABLE II

[Percent smoke reduction employing calcium compounds in diesel fuel at 0.072% calcium]

| Run | Additive and mol ratio | Smoke reduction, percent | |
|---|---|---|---|
| | | Petter Engine | GM 3-71 Engine |
| 1 | Calcium $C_{10-12}$ alkylphenolate | | 21 |
| 2 | Calcium sulfurized $C_{10-12}$ alkylphenolate, 1 <br> Calcium carbonate, 2 | | 11 |
| 3 | Calcium sulfurized $C_{10-12}$ alkylphenolate, 1 <br> Calcium carbonate, 3 | | 16 |
| 4 | Calcium $C_{10-12}$ alkylphenolate, 1 <br> Calcium 2-methoxy ethoxide, 1 | 53 | 69 |
| 5 | Calcium sulfurized $C_{10-12}$ alkylphenolate, 1 <br> Calcium 2-methoxy ethoxide, 1 | | 59 |
| 6 | Calcium sulfurized $C_{10-12}$ alkylphenolate, 1 <br> Calcium 2-methoxy ethoxide, 1 <br> Calcium hydroxide, 1 | | 50 |

Runs 4, 5 and 6 represent the present invention showing additive combinations of calcium alkylphenolate or sulfurized calcium alkylphenolate with calcium 2-methoxyethoxide giving a high percentage of smoke reduction. Calcium alkylphenolate alone or in combination with calcium carbonate gave extremely low levels of smoke suppression and were essentially ineffective for this purpose.

Obviously many modifications and variations of the invention, as hereinbefore set forth, may be made without departing from the spirit and scope thereof, and therefore, only such limitations should be imposed as are indicated in the appended claims.

We claim:

1. A diesel fuel composition comprising a mixture of hydrocarbons boiling in the range of 350–700° F. and an effective smoke suppressing amount of an additive combination comprising: (a) a calcium alkylphenolate having the formula:

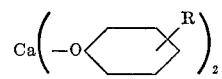

in which R is an alkyl radical having from 4 to 30 carbon atoms and the sulfurized derivative thereof, and (b) a calcium alkoxyalkoxide represented by the formula:

$$Ca[O(R'O)yR]_z$$

in which R represents nil, hydrogen or an alkyl radical having from 1 to 10 carbon atoms, R' is an alkylene radical having from 2 to 4 carbon atoms, z has a value of 1 when R is nil and z has a value of 2 when R is H or alkyl and y has a value from 0 to 4.

2. A fuel composition according to claim 1 in which the additive combination consists of 0.1 to 3 moles of said calcium alkoxyalkoxide per mole of said calcium alkylphenolate.

3. A fuel composition according to claim 1 containing from about 0.01 to 0.4 weight percent of said additive combination calculated on a calcium metal basis.

4. A fuel composition according to claim 1 in which said additive combination consists of 1:1 mole proportions of said calcium alkylphenolate and said calcium alkoxyalkoxide.

5. A fuel composition according to claim 1 in which said additive combination consists of calcium $C_{10-12}$ alkylphenolate and calcium 2-methoxyethoxide.

6. A fuel composition according to claim 1 in which said additive combination consists of calcium sulfurized $C_{10-12}$ alkylphenolate and calcium 2-methoxyethoxide.

7. A method for reducing the exhaust smoke of a diesel engine which comprises supplying to and burning in said engine a diesel fuel composition comprising a mixture of hydrocarbons boiling in the range of 350 to 700° F. and an effective smoke suppressing amount of an additive combination comprising (a) a calcium alkylphenolate having the formula:

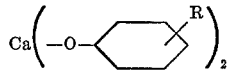

in which R is an alkyl radical having from 4 to 30 carbon atoms and the sulfurized derivative thereof, and (b) a calcium alkoxyalkoxide represented by the formula:

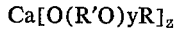

in which R represents nil, hydrogen or an alkyl radical having from 1 to 10 carbon atoms, R' is an alkylene radical having from 2 to 4 carbon atoms, z has a value of 1 when R is nil and z has a value of 2 when R is H or alkyl and y has a value from 0 to 4.

8. A method according to claim 7 in which said additive combination consists of 0.1 to 3 moles of said calcium alkoxyalkoxide per mole of said calcium alkylphenolate.

9. A method according to claim 7 in which said composition contains from 0.01 to 0.4 weight percent of said additive combination calculated on a calcium metal basis.

10. A method according to claim 7 in which said additive combination consists of calcium $C_{10-12}$ alkylphenolate and calcium 2-methoxyethoxide.

11. A method according to claim 7 in which said additive combination consists of calcium sulfurized $C_{10-12}$ alkylphenolate and calcium 2-methoxyethoxide.

References Cited

UNITED STATES PATENTS

| | | | |
|---|---|---|---|
| 2,916,454 | 12/1959 | Bradley et al. | 44—76 X |
| 3,410,670 | 11/1968 | Le Suer | 44—57 |
| 3,413,102 | 11/1968 | Andress | 44—57 |

DANIEL E. WYMAN, Primary Examiner

W. J. SHINE, Assistant Examiner

U.S. Cl. X.R.

44—57, 78